Dec. 4, 1951  A. F. FRIBERG  2,577,613
VALVE
Filed Jan. 6, 1947  4 Sheets-Sheet 3
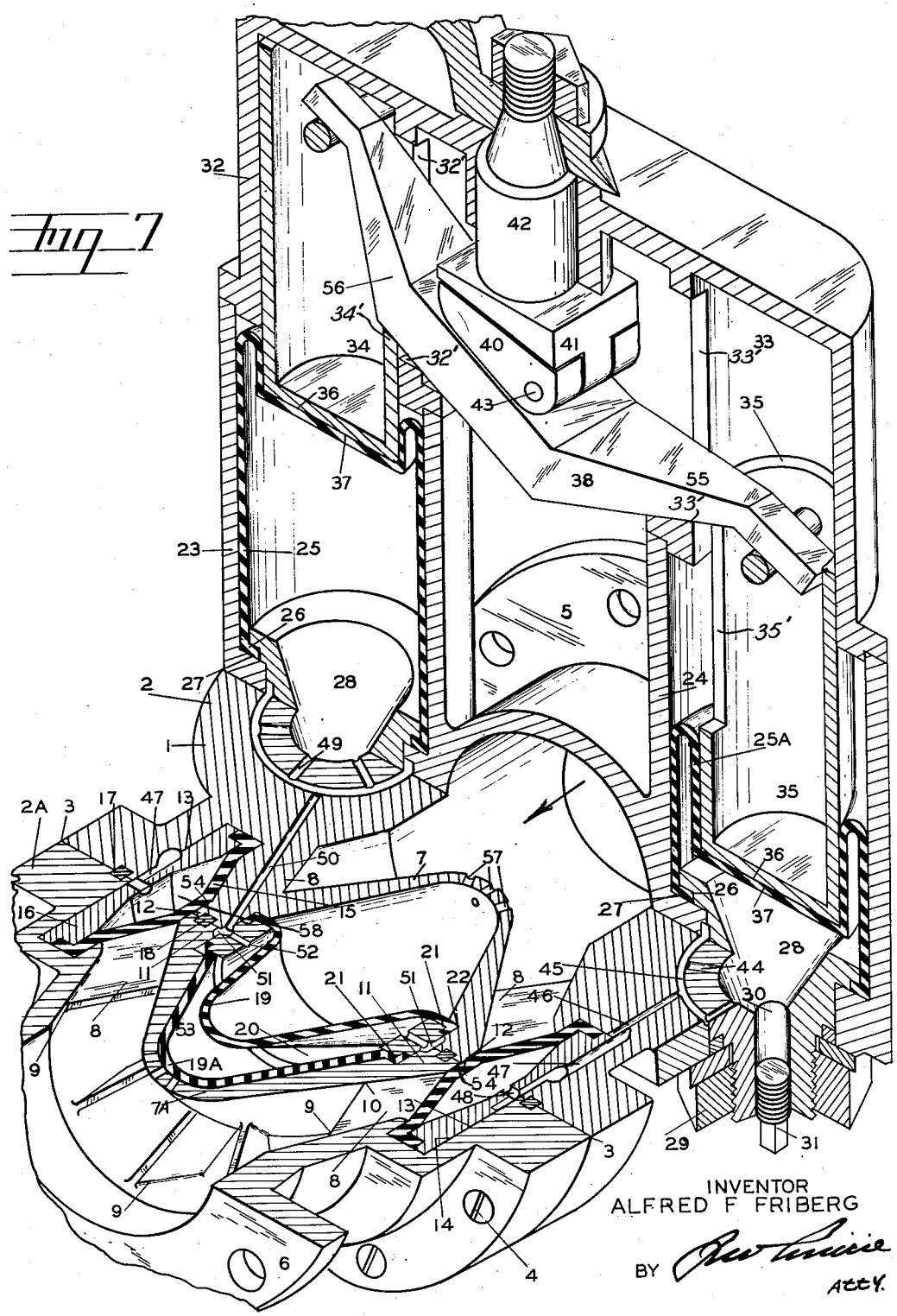
INVENTOR
ALFRED F. FRIBERG
BY
ATTY.

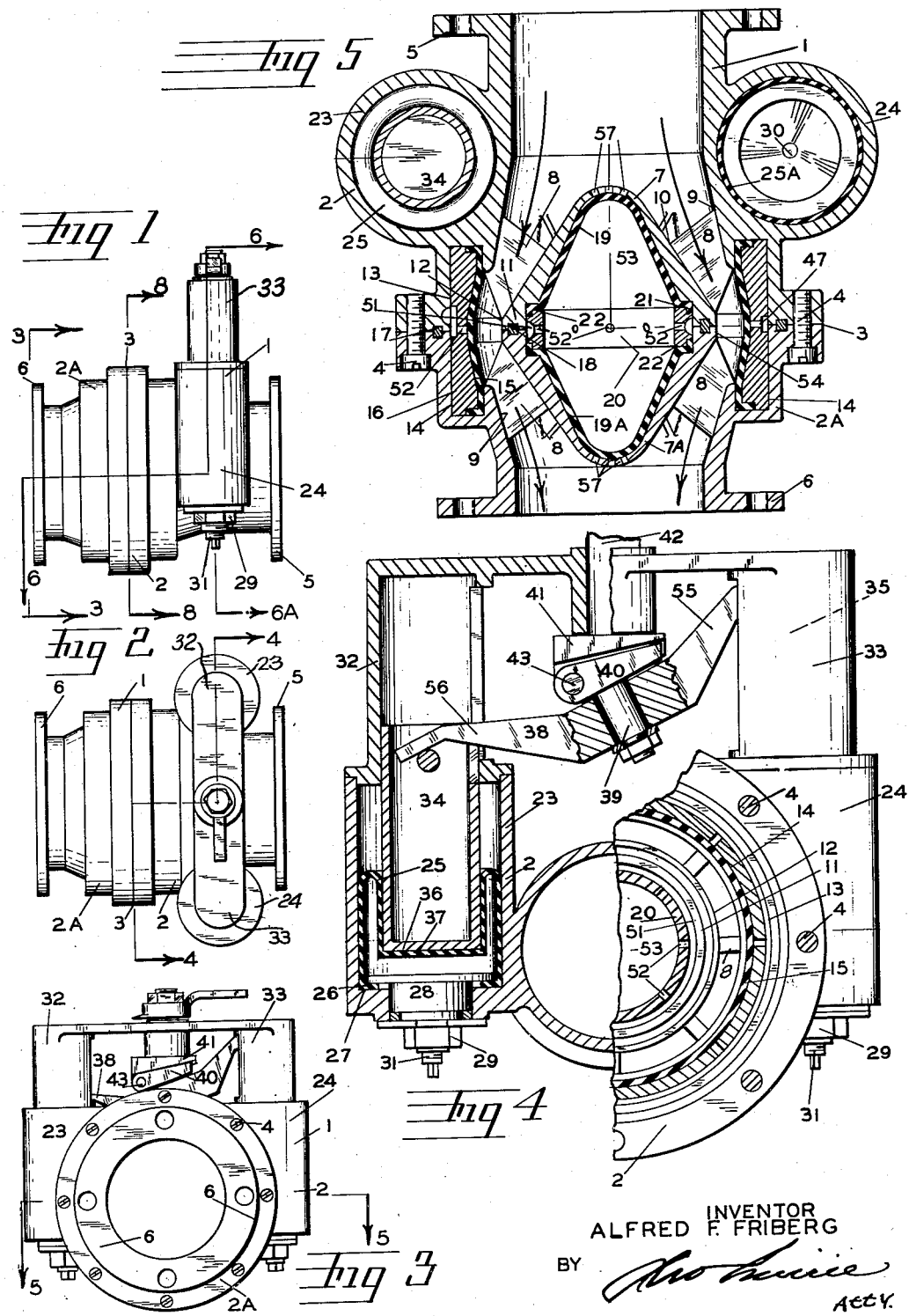

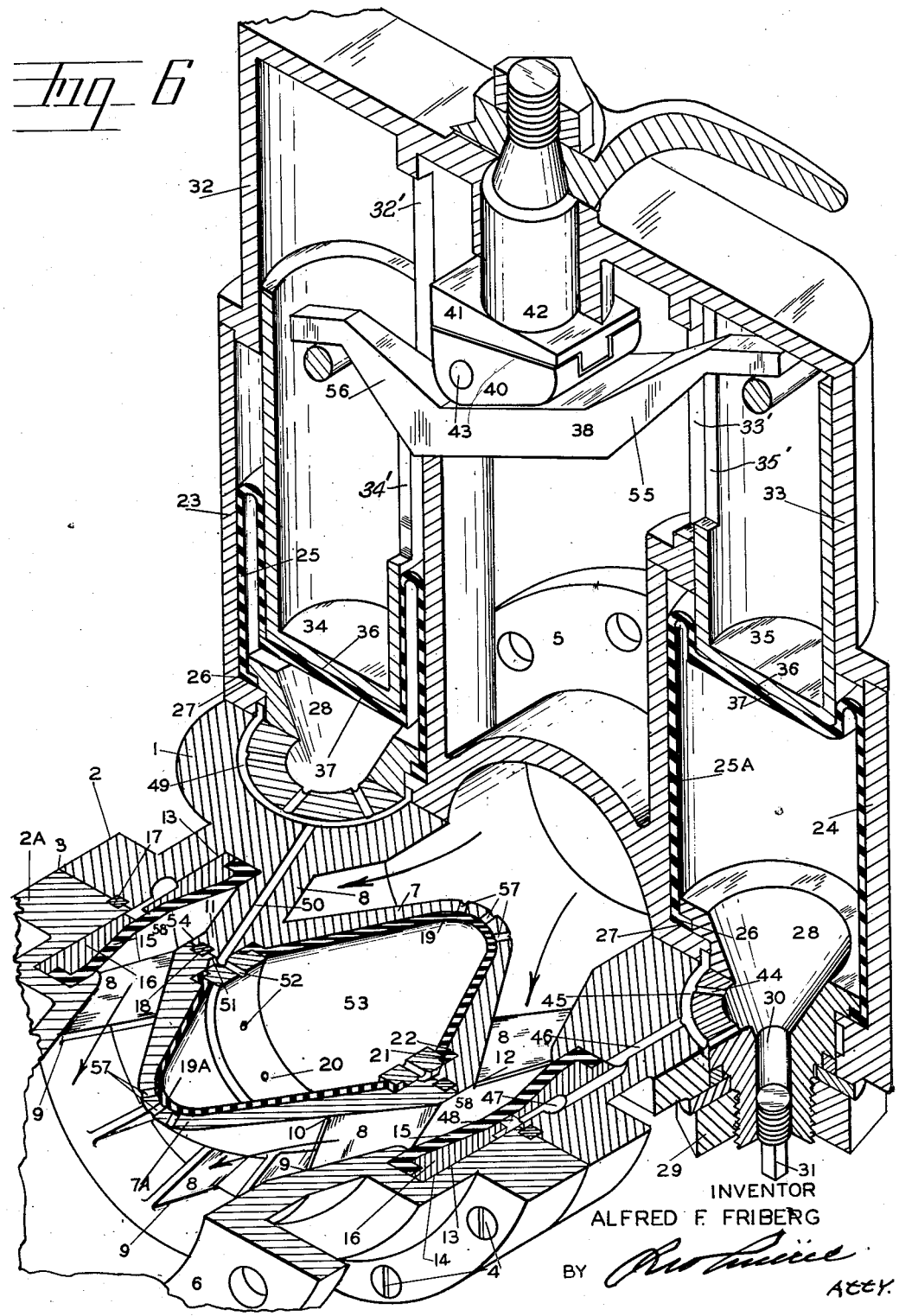

Dec. 4, 1951  A. F. FRIBERG  2,577,613
VALVE
Filed Jan. 6, 1947  4 Sheets-Sheet 4
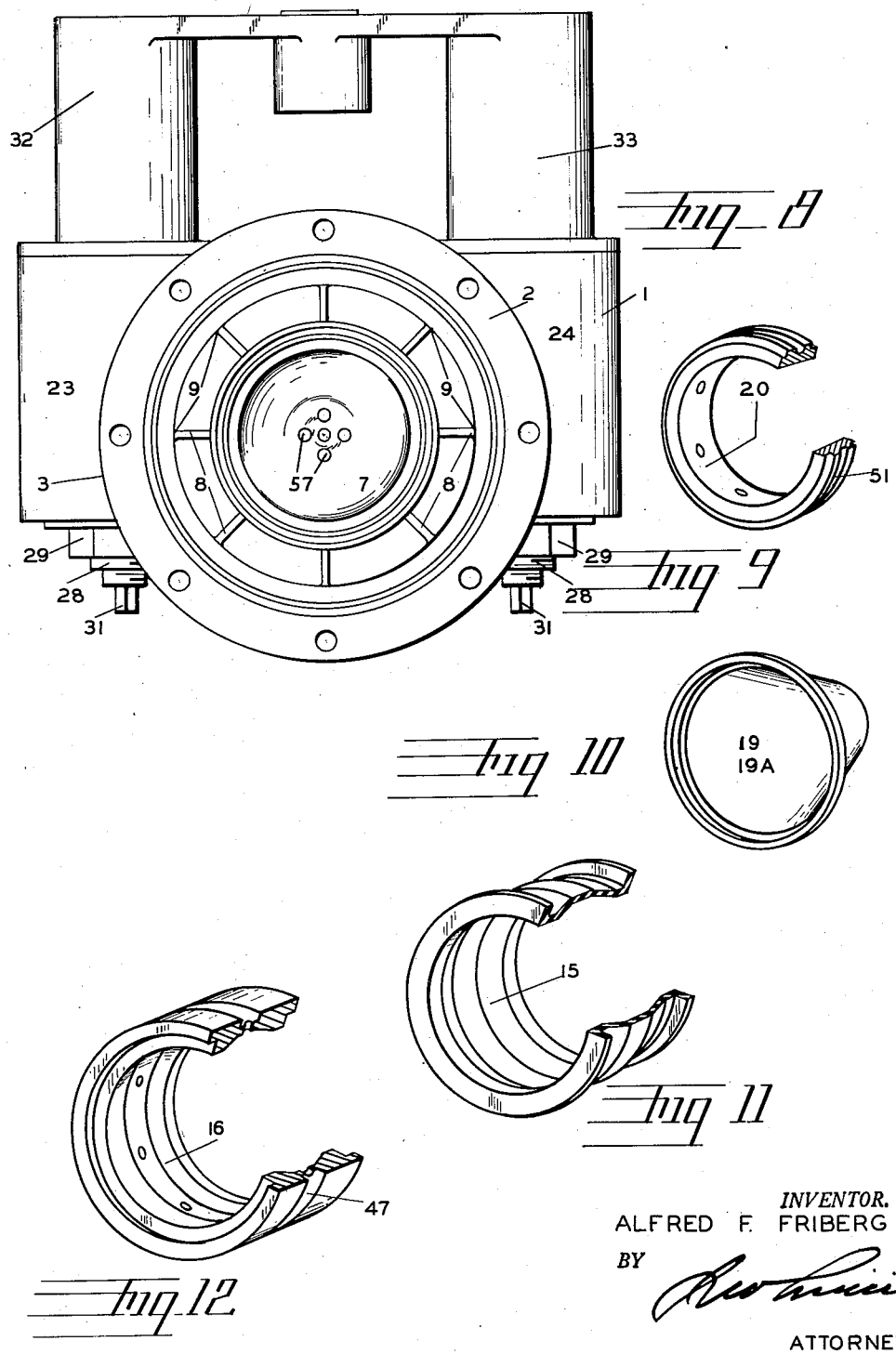
INVENTOR.
ALFRED F. FRIBERG
BY
ATTORNEY Patented Dec. 4, 1951

2,577,613

UNITED STATES PATENT OFFICE 2,577,613

VALVE

Alfred E. Friberg, Portland, Oreg.

Application January 6, 1947, Serial No. 720,393

10 Claims. (Cl. 137—139)

1

This invention relates to valves for pipe lines and is particularly adapted for stopping or allowing the flow of fluids therethrough in either direction, thus making it particularly adapted for use as a stop valve.

The primary object of the invention is to employ the pressure within the pipe line by converting said pressure to power and utilizing this power for operating the valve. This fluid power is used in such a manner as to either keep the valve in opened or closed position, and is controlled by a simple hand operation requiring considerably less effort than that usually required in operating the customary valve, but still providing a maximum speed of operation. By employing the fluid pressure within the pipe line the source of power for opening and closing the valve is provided eliminating the use of outside power such as electric motors, gearing, hand wheels and so forth.

A further object of my invention is the combining of hydraulic flexible elements and mechanical mechanisms in such a manner as to make the valve a self-contained unit. This combination with independent fluids and mechanical leverage will give a balanced displacement within the pipe line as the flexible elements changes shape from opened and closed positions.

By employing the above combination of elements within the valve I have provided a valve that will operate from the line pressure with a minimum of manual effort and with a maximum of speed employing a light seat which will stop the flow of fluid in either direction, a valve with minimum friction losses and having sealed joints to prevent leakage, all of the units self-contained within the valve.

These and other incidental objects will be apparent in the drawings, specification and claims.

Referring to the drawings:

Figure 1 is a side view of my new and improved valve.

Figure 2 is a plan view of Figure 1.

Figure 3 is an end view taken on line 3—3 of Figure 1.

Figure 4 is an end sectional view taken on line 4—4 of Figure 2, parts broken away for convenience of illustration.

Figure 5 is a plan sectional view taken on line 5—5 of Figure 3.

Figure 6 is an enlarged isometric perspective sectional view of the valve shown in open position, taken on line 6—6—6A of Figure 1.

Figure 7 is an enlarged sectional isometric perspective view taken on line 6—6—6A of Figure 1 showing the valves in closed position.

2

Figure 8 is a sectional view taken on line 8—8 of Figure 1, parts omitted for convenience of illustration.

Figure 9 is an end perspective view of the retainer ring indicated by numeral 20 of the drawings, partly broken away for convenience of illustration.

Figure 10 is an end perspective view of one of the flexible elements indicated by numerals 19 and 19A of the drawings.

Figure 11 is an end perspective view of the flexible element 15 illustrated in the drawing, partly broken away for convenience of illustration.

Figure 12 is an end perspective view of the retainer ring indicated by numeral 16 in the drawing, partly broken away for convenience of illustration.

In the drawings:

My valve is comprised of a body 1, consisting of two parts 2 and 2A, having flanges 3 which are secured together by the bolts 4, or any other suitable means. My valve may have any suitable type of inlet and outlet to be connected in a pipe line as for instance by means of flanges 5 and 6. Located within the body of the valve are oppositely disposed cones 7 and 7A which are rigid and, preferably, integral with the parts 2 and 2A respectively of the valve body 1. These cones are mounted or secured within said parts by the webs 8 which are integrally connected with the main body portions 2 and 2A at 9 and with the cones 7 and 7A at 10. The cones are in engagement at their larger ends and the peripheries 12 of these enlarged ends are spaced concentrically within the inner wall of the valve body, these peripheries 12 cooperating in defining a unitary wall or seat 54 that is separated from the inner body wall by an annular passage or space 58.

Resting within the annular grooves 14 of the valve body is a flexible ring shaped element 15, which is secured in and to the valve body by a retainer ring 16. A seal 17 is provided between the parts 2 and 8A of the valve, a seal 18 also being provided between the ends 11 of the cones 7 and 7A. These seals maintain a fluid tight joint between the said valve parts and cone elements. Located within the cones 7 and 7A are flexible elements 19 and 19A. These elements are sealed to and secured between the cones 7 and 7A by the retainer ring 20 which compresses the flanges 21 of the flexible elements 19 and 19A against the shoulders 22 of the cones 7 and 7A.

Located on the side of the body part 2 of the valve are chambers 23 and 24. These chambers contain flexible elements 25 and 25A which are liquid tight, their lower ends having flanges 26 held against the shoulders 27 of the bottom of the chambers by the sealing and filling plugs 28 which are held in place by locking nuts 29. The plugs 28 each have a passage 30 to the outside and which is closed by a removable plug 31.

A pair of cylinders 32 and 33 are mounted in alignment with the chambers 23 and 24 and have pistons 34 and 35 working therein. The lower ends 36 of these pistons rest on the top 37 of the flexible elements 25 and 25A. The chambers 23 and 24 are slightly larger than the outside diameters of the pistons 34 and as these pistons travel downwardly they telescope the upper ends 37 of the elements 25 and 25A within themselves. These pistons are operated by the action of the pressure within the pipe line and will be more fully described later on.

A walking beam 38 is pivotally mounted to the king bolt 39, which in turn is supported by an off-center transverse pivot 43 that is revolvably carried by a rotatably mounted stem 42, as best shown in Fig. 4. The king bolt 39 has a bifurcated or slotted transversely wedge-shaped head 40 that straddles and is pivotally mounted at one end by the transverse pin 43 to one end of a keyed transversely wedge-shaped base 41 of the valve stem 42. It will be noted that the pivot pin 43 is off-center with respect to both the valve stem axis and the king bolt axis or mid-section of the walking beam.

By this construction, rotation of the valve stem 42 will revolve the off-center pivot pin 43 and rotate the king bolt 39 relative to the walking beam 38, thereby varying the relative length of the beam arms 55 and 56 with respect to pivot 43. During this revolving movement the head 40 swings on the pivot pin 43 relative to the base 41 to swing the king bolt 39 into alignment with the valve stem 42 and enable rotation of the king bolt relative to the beam. The head 40 and base 41 are keyed transversely of the pivot 43 to directly transmit torsion while permitting the relative swinging, thereby relieving the pivot 43 of torsional or transverse strain. The walking beam 38 is restrained against rotation with the king bolt 39 by its arms 55 and 56 riding in guide slots 32' and 33' in the respective cylinders 32 and 33. The pistons 34 and 35 also have slots 34' and 35' in their respective side walls and corresponding to the cylinder slots for accommodation of the beam arms.

I will now describe the charging of the valve by fluid. The flexible elements 25 and 25A are filled or charged through the passages 30 with a suitable fluid upon removal of the plugs 31. When the element 25A, within the chamber 24, is charged fluid flows through the ports 44, 45 and 46 and into the annular groove 47 between the valve body and the outer periphery of the ring 16. This fluid then passes out through the openings 48 from this annular groove between the ring 16 and the flexible element 15, expanding the element 15 across the space or passage 58, as best shown in Figure 7.

When the flexible element 25 within the chamber 23 is charged, the fluid will also pass through the ports 49 and 50 into the annular groove 51 surrounding the outer periphery of the retaining ring 20, and through the ports 52 into the space 53 within the flexible elements 19 and 19A. This completes the charging with fluid of the various fluid chambers and spaces within the valve.

I will now describe the operation of the valve.

Referring to Figures 4, 5 and 6, the valve is shown in an open position wherein the flexible element 15 is shown moved or contracted against the valve body and away from its seat 54, surrounding the periphery of the cones 7 and 7A permitting flow through the valve and annular passage 58, as indicated by the arrows.

The flexible element 15 is moved to the position shown by the action of the line pressure within the valve. This movement of the element 15 forces the liquid from the chamber between the element 15 and ring 16 into the annular chamber 47 out through the ports 46, 45 and 44 and into the flexible element 25A contained within the chamber 24. It will be noted that the walking beam 38 is in a position for accommodating the elevation of the piston 35, permitting the fluid to enter the flexible element 25A and be stored therein.

It will be noted also that the walking beam 38 has depressed the piston 34 which has collapsed the flexible element 25, expelling the fluid contained within the chamber 24 and the element 25 into the space 53, expanding the flexible elements 19 and 19A within the cones 7 and 7A. The pressures within the body of the valve surrounding the cone elements 7 and 7A, within the flexible elements 15 and 25A are equal, when the parts are in the positions shown in Figs. 4, 5 and 6. These pressures will create a greater pressure within the chamber 23 and the element 25 by the action of the longer lever arm 55 of the walking beam creating a greater pressure that is applied to the piston 34 than that exerted against the piston 35 by the line pressure.

The pressure thus developed within said chamber 23 will be transmitted into the space 53 within the elements 19 and 19A within the cones 7 and 7A, overcoming the tendency of the line pressure to collapse said elements 19 and 19A, and thereby permitting the liquid within the flexible element 15 to be expelled into the chamber 24 and opening the annular passage 58 to allow fluid within the line to flow through the valve.

Referring to Figure 7, I will now describe the operation causing the valve to close. The valve stem 42 is turned 180 degrees, which reverses the relative length and the consequent reaction of the lever arms 55 and 56. The lower arm 55 then becomes the short arm, while the arm 56 becomes the long arm. Therefore, the pressure within the chamber 24 will be increased while the pressure within the chamber 23 will become equal to the line pressure.

Line pressure enters the tips of the cone through the openings 57, collapsing the element 19, as shown. This forces the fluid within the chamber 53 out through the ports 52, passages 50 and ports 49 into the flexible element 25 within the chamber 23, raising the piston 34, operating the long lever arm 56 of the walking beam 38, increasing the leverage on the arm 55 forcing the piston 35 down, collapsing the flexible element 25A and thereby forcing the liquid through the ports 44, 45 and 46 into the annular groove 47, and through the openings 48 to expand or force the flexible element 15 against the seat 54 and intercepting the annular passage 58 to interrupt the flow through the valve.

From the above description it can be readily understood that the changing of the relative length of the lever arms by varying their pivotal axis relative to the center line of the valve stem and walking beam, enables the line pressure to unbalance the pressures between the two closed fluid circuits and thereby operate the valve.

Due to the direction of the flow of liquid through the valve, as indicated by the arrows in the drawings, the flexible element 19 is shown as collapsed in Figure 7. On the reversal of flow through the valve, the flexible element 19A would be the element subject to and be collapsed by line pressure. This is the only difference in the action of the present valve when line direction is reversed.

I do not wish to be limited to the exact mechanical structure as illustrated and described, as other mechanical equivalents may be substituted still coming within the scope of my claims.

I claim:

1. A valve construction comprising a body having a passage for flow of fluid therethrough, a collapsible fluid tight inner chamber mounted in and spaced from the interior wall of said passage, a collapsible fluid tight outer chamber surrounding said inner chamber and cooperative with the latter to control the flow of fluid through said passage, a pair of cylinders on said body and having fluid tight communications respectively with said inner and outer chambers for confining an operating fluid therein, a piston reciprocative in each of said cylinders, and selectively adjustable means interconnecting said pistons and rockable by reciprocation of said pistons to control opening and closing of said passage.

2. A construction as claimed in claim 1, wherein said outer chamber comprises an annular flexible wall concentric with the inner chamber and fixed to the interior wall of said passage, said flexible wall being collapsible against said passage wall and movable from the latter and against said inner chamber to close said passage when the pressure of fluid in said outer collapsible chamber is higher than the pressure of fluid in said inner collapsible chamber.

3. A construction as claimed in claim 1, wherein each of said cylinders has a flexible wall fixed interiorly thereof and collapsible by the compression stroke movement of the pistons.

4. A construction as claimed in claim 1, wherein said selectively adjustable means comprises a pivotally adjustable support and a lever fulcrumed off center on said support and adapted to rock so as to depress that piston engaged by its shorter arm by the pressure exerted upon its longer arm by the other of said pistons.

5. A construction as claimed in claim 1, wherein said selectively adjustable means comprises a support, a lever connected by an off center pivot with the support and having the shorter arm bearing upon one of said pistons and the opposite longer arm bearing upon the other of said pistons, and means mounting the support on the body whereby the latter is adapted to be selectively turned to reverse the relation of the lengths of the lever arms upon the respective pistons.

6. A construction as claimed in claim 1, wherein said inner collapsible chamber comprises a pair of rigid complementary conical sections joined at their larger base ends to define a rigid chamber, and a pair of flexible walls fixed in the respective sections, said flexible walls being adapted to assume positions against the inner walls of the conical sections when expanded in said rigid chamber.

7. A valve construction as defined in claim 1 wherein said inner collapsible chamber comprises a rigid chamber having communication with said passage to equalize pressures therein, and a flexible wall fixed within said rigid chamber and providing an interior chamber that is collapsible by the pressure from said passage.

8. A valve construction as defined in claim 1, wherein said inner collapsible chamber comprises a rigid chamber having a diminishing conical taper from its medial portion to its ends axially of said passage, a flexible wall mounted in said rigid chamber to define a collapsible interior chamber, and a plurality of apertures at each reduced end of said rigid chamber for admitting fluid from said passage to collapse said flexible wall interior chamber therein when the pressure of operating fluid therein is lower than the pressure of fluid in said outer chamber.

9. A valve construction as defined in claim 1 wherein said selectively adjustable means comprises a lever operatively connected at its respective ends with said pistons, an off-center pivot that is adjustable relative to said lever to alternate the relative length of the lever's arms so as to depress that piston engaged by the shorter arm through the pressure exerted upon the longer arm by the other of said pistons, and means for adjusting said off-center pivot in relation to said lever to vary the relative lengths of its arms and cause said lever to rock and reciprocate said pistons.

10. A valve construction as defined in claim 1 wherein said selectively adjustable means comprises a pivotally mounted control member, pivot means carried by said control member and having an axis perpendicular to and spaced from the axis of said control member, a pivot pin supported by said pivot means and having an axis perpendicular to and spaced from said pivot means axis, and a lever connected at its respective ends to said pistons and centrally mounted on said pivot pin to be rockable off-center about the axis of said pivot means while enabling relative rotation of said pivot pin by said control means through said pivot means to vary the relation between said pivot means and lever.

ALFRED F. FRIBERG.

REFERENCES CITED

The following references are of record in the file of this patent:

UNITED STATES PATENTS

| Number | Name | Date |
| --- | --- | --- |
| 800,358 | Chapsal | Sept. 26, 1905 |
| 2,084,368 | Wynn | June 22, 1937 |
| 2,317,376 | Grove | Apr. 27, 1943 |